Sept. 7, 1948.  J. RABINOWITZ  2,448,736
PHOTOGRAPHIC SHUTTER OPERATING
AND CONTROL MECHANISM
Filed Nov. 16, 1946
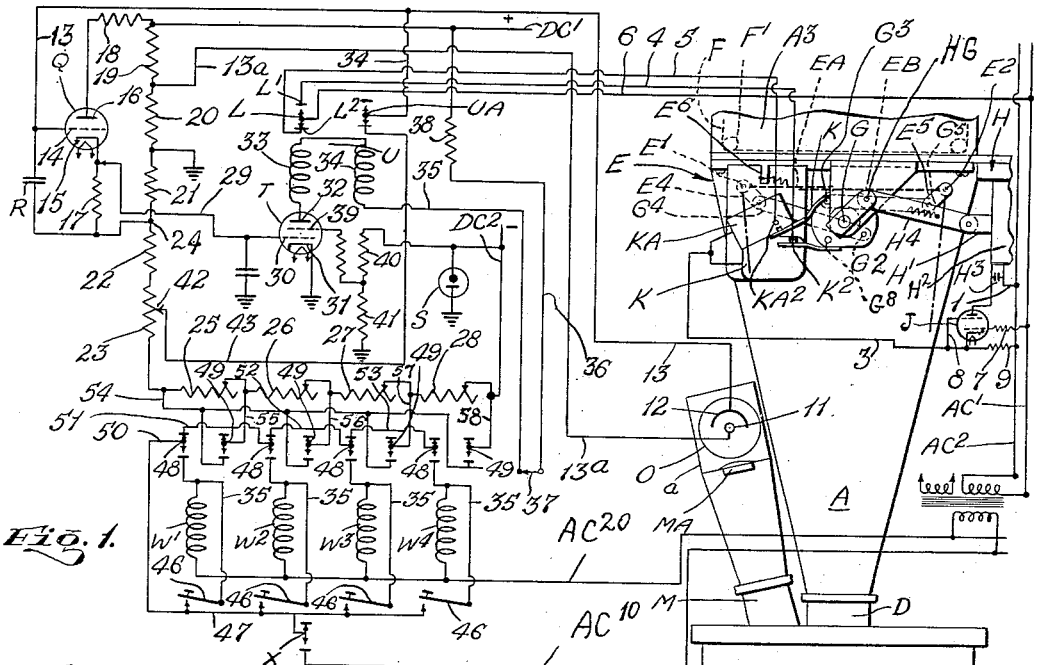
INVENTOR
JACOB RABINOWITZ
BY
John E. Hubbell
ATTORNEY Patented Sept. 7, 1948

2,448,736

UNITED STATES PATENT OFFICE 2,448,736

PHOTOGRAPHIC SHUTTER OPERATING AND CONTROL MECHANISM

Jacob Rabinowitz, Brooklyn, N. Y., assignor to Pavelle Color Incorporated, New York, N. Y., a corporation of Delaware Application November 16, 1946, Serial No. 710,251

6 Claims. (Cl. 95—53)

1

The general object of the present invention is to provide improved operating mechanism for photographic shutters, and particularly for shutters used in photographic apparatus such as a commercial projection printer in which the shutter must be opened and closed in prompt response to the operation of a control element at the beginning and end of each of exposure operations which may be repeated at short intervals during day long periods of use.

A more specific object of the present invention, is to provide a shutter operating mechanism comprising an electromagnetic actuating element, and means including an electronic tube of the type known as a thyratron for momentarily energizing said element to initiate each shutter opening and each shutter closing movement, and for deenergizing said element prior to the completion of each such movement.

The shutters of commercial projection printers are of such weight and size as to have considerable inertia, and to open and close them with suitable rapidity by electromagnetic means requires considerable electrical power. Deenergization of the relay promptly after the initiation of each shutter opening or closing movement results in a substantial saving of power, and what is of more importance, it makes the heating action to which the apparatus and photographic material are subjected much smaller than it would be if the energization of the relay were maintained throughout the exposure period.

To minimize the magnitude and heating effect of the relay energizing current, it is desirable to supply that current at 400 or 500 volts. Alternating current energization of the shutter operating relay is not satisfactory and heretofore it has been customary to use direct current supplied at 400 or 500 volts. The supply of direct current at that voltage ordinarily requires the use of a special and relatively expensive apparatus to produce the desired amount of high voltage direct current by the use of alternating or direct current supplied at a relatively low voltage. Furthermore, the use of direct current supplied at a voltage of the order of 500 volts requires rather elaborate apparatus including condensers to prevent injurious contact sparking, and the reactance in such apparatus builds up a sparking voltage which may be several times the normal D. C. working voltage.

In the preferred form of the apparatus which I have devised to attain the above mentioned objects of the invention and to avoid the above mentioned disadvantages of prior apparatus, the

2 winding of the shutter operating electromagnet is included in the plate circuit of a thyratron tube with an energizing source of alternating current and an automatic switch mechanism. The source of the energizing current may well be the secondary winding of a step-up transformer supplying alternating current at 500 volts or so, and the automatic switch mechanism opens the plate circuit at the end of an initial portion of each shutter opening and shutter closing movement. The invention in its preferred form also includes a spring or other energy storing means which operates to complete each shutter opening and closing movement and to return the core or armature element of the electromagnet to the same normal position following each such movement.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a diagram illustrating a preferred embodiment of the present invention;

Fig. 2 is an enlarged diagram showing parts of Fig. 1 on a larger scale and in different positions; and Fig. 3 is an inverted plan view of a portion of the shutter mechanism shown diagrammatically in Fig. 1.

In the drawings I have illustrated the use of my present invention in a projection printer A comprising a light chamber A' provided with an incandescent lamp or other suitable source of light to be transmitted through a picture bearing transparency B mounted on a support C and thence through a lens D and a shutter E, when the latter is open, to light sensitive material shown as a film F running over rollers F' located in a lightproof housing $A^3$. The film F may be intermittently advanced by feed mechanism, not shown, to successively expose successive sections of the film to light transmitted through the transparency or transparencies B. As shown, the shutter E is of the known type comprising a pair of shutter flaps EA and EB carried by parallel rock shafts E' and $E^2$ at opposite sides of the exposure orifice $E^3$ of the shutter. In the closed condition of the shutter, the flaps EA and EB are in parallel overlapping relation with one another.

Opening movements of the shutter flaps EA and EB, are effected by giving the shaft E' a clockwise rotation of approximately 90 degrees, and by giving the shaft $E^2$ a counterclockwise rotation of about 90 degrees, as seen in Fig. 1. In the construction shown, the shafts E' and $E^2$ are oscillated to move the corresponding shutter flaps back and forth between their closed and open positions by means comprising a rock shaft G and a lever and a link connection between the shaft G and each of the shafts E' and $E^2$, and a lever and link connection between the shaft G and the core or armature H' of an electromagnet H. The latter is shown as of the solenoid type, comprising an energizing coil $H^2$ shunted by a condenser $H^3$. An element G' rigidly attached to the rock shaft G serves as a switch actuating cam, and as a crank disc carrying crank pins $G^2$ and $G^3$. The crank pin $G^2$ is connected by a link $G^4$ to a lever arm $E^4$ rigidly secured to the shutter flap shaft E' and the crank pin $G^3$ is connected by a link $G^5$ to a lever arm $E^5$ secured to the shutter flap shaft $E^2$. The crank pins $G^2$ and $G^3$ are at opposite sides of the shaft G, and are shown in their shutter closed positions in Fig. 1 and in their shutter open positions in Fig. 2. When the shaft G is turned approximately 90 degrees in the counterclockwise direction from its position shown in Fig. 1, the shutter flaps EA and EB are moved from the position in which they overlap one another, into their dependent positions shown in dotted lines in Fig. 1. A reverse movement of the shaft G returns the shutter flaps to their overlapping parallel relation.

The means through which the shaft G is oscillated comprise a crank arm $G^6$ secured to the shaft G and having its outer end connected by a link $H^4$ to the core or armature H' of the electromagnet H. When the shutter is wide open and also when it is fully closed, the armature H' extends out of the magnet coil, but the armature is drawn into the coil when the latter is energized to effect a shutter closing or a shutter opening movement. The crank arm $G^3$ and crank pins $G^2$ and $G^3$ are secured to the shaft G in such angular relation that at approximately the midpoint of each shutter opening or closing movement, the pivot pin HG which connects the crank arm $G^6$ and link $H^4$, will pass through the dead center plane including the axes of the shaft G and the armature H'. At about the time, but preferably somewhat before the pin HG reaches said plane in each movement, the electromagnet coil or winding $H^2$ is deenergized in a manner described later. A tension spring I having one end connected to a postlike portion $E^6$ of the stationary shutter structure and having its other end connected to a pin $H^5$ carried by the link $H^4$, subjects the armature H' to a pull as the crank arm $G^6$ moves in either direction away from its mid-position. The spring I thus serves to complete each shutter opening movement and each shutter closing movement, notwithstanding the deenergization of the magnet H.

As shown in Fig. 1, the winding $H^2$ of the electromagnet H is intermittently energized by the rectified plate current of an electronic valve J, which may well be a thyratron of the commercially available 2050 type, and is supplied with anode voltage by alternating current supply conductor AC' and $AC^2$. The plate circuit which is closed to initiate a shutter opening movement, comprises the supply conductor $AC^2$, conductor 1, electromagnet winding $H^2$ and condenser $H^3$ in parallel therewith, conductor 2, anode and cathode of the valve J, conductor 3, the normally closed switch K comprising a movable switch member K' and a stationary switch contact $K^2$, a conductor 4, a stationary switch contact L', switch member L, conductor 6 and supply conductor AC'. The plate circuit of the valve J closed to initiate a shutter closing movement, differs from the shutter opening circuit just traced by the inclusion of the normally open switch KA, comprising the movable switch member KA' and stationary contact $KA^2$, the conductor 5, and stationary switch contact $L^2$ in lieu of the switch elements K and $K^2$, conductor 4, and switch contact L' of the circuit first traced. The valve J has its control grid connected to the alternating current supply conductor AC' by a resistance 7, which may vary in accordance with the voltage across the supply conductors AC' and $AC^2$, and may well be of the order of 250,000 ohms when voltage across the supply conductors is 500 volts, as it may well be. The input circuit of the valve J which includes the resistance 7 connecting the control grid of the valve J to the supply conductor AC', may be completed to the cathode of the valve J, as is shown in Fig. 2, through the conductor 4 and switch member K or through the conductor 5 and switch member KA depending upon the adjustment positions of the shaft G and switch member L. Advantageously, and as shown, the cathode is connected by a conductor 8 to the screen grid of the valve J, and is connected to the supply conductor $AC^2$ by an isolation resistor 9 which may be of the order of 50,000 ohms.

The switch K shown diagrammatically in Fig. 1 may be of the commercially available microswitch type, as shown in Fig. 3, connected for operation as a normally closed switch, and the switch KA shown diagrammatically in Fig. 1 may be a similar microswitch connected for operation as a normally open switch. As will be apparent, the closure of the plate, or output, circuit of the valve J depends upon the positions of the movable switch members K' and KA' and L. In Fig. 1 the switch members K', KA' and L are shown in the positions respectively occupied by them when the shutter E is closed and the electromagnet H is deenergized, as it is during the interval between two successive exposures. In Fig. 2, the switch members K, KA and L, are shown in the positions occupied by them when the shutter is wide open.

In the shutter closed condition of the apparatus shown in Fig. 1, the switch member L is in the position in which it engages the stationary contact $L^2$. To open the shutter E and thereby initiate an exposure period, the switch member L is moved out of engagement with the stationary contact $L^2$ and into engagement with the stationary contact L'. This closes that plate circuit of the valve J which includes the normally closed switch K and thus energizes the shutter opening magnet winding $H^2$. As the shutter opening operation proceeds, the cam member $G^2$ first opens the normally closed switch K and then closes the normally open switch KA. The switches K and KA then remain in their respective open and closed positions, shown in Fig. 2, until after the initiation of the shutter closing movement which terminates the exposure period. The shutter closing movement is initiated by moving the switch L back into engagement with the contact L². In the course of the shutter closing movement the switch KA is returned to its normally open condition and the switch K is returned to its normally closed position. The manner in which the switch L is operated is referred to later.

The switches K and KA are adjusted between their respective closed and open positions by cam parts carried by the crank disc G'. When the disc G' occupies its position shown in Fig. 1, its cam parts are not in operative engagement with and do not disturb the normally closed switch K or the normally open switch KA. When the crank disc G' is turned clockwise out of its Fig. 1 position in a shutter opening movement, the edge cam surface G⁷ of member G' engages the movable switch member K' and moves it out of engagement with the contact K². The angular movement of the member G' required to open the switch K should not exceed, and is preferably slightly less than, half of the range of movement of the member G' between its shutter closed and shutter open positions. During the movement in the clockwise direction of the member G' required to fully open the shutter, the member G' moves the switch member KA' into the position in which it engages the contact KA² and thus closes the normally open switch KA. As shown, the member G' actuates the switch member KA' through a cam part in the form of a pin G⁸ which projects from side of the member G' and is parallel to shaft G. The closing of the switch KA' should not occur until after the member G' has moved through more than half of its range of clockwise movement.

The deenergization of the electromagnet H shortly prior to the movement of the axis of the pivot HG across the dead center plane including the axes of the shaft G and magnet core H', does not interrupt clockwise movement of member G' since the inertia of the parts keeps the parts in motion until the line of action of the spring I is such that the latter becomes effective to continue the shutter movement. When the magnet H is energized to initiate a shutter closing movement, the return movement of the member G' in the counterclockwise direction opens the switch KA and deenergizes the magnet H shortly before the axis of the pivot HG reaches the above mentioned dead center plane. Thereafter the shutter closing movement is continued by the inertia of the moving parts and by the action of the tension spring I. As will be apparent, the closure of the normally open switch KA during the shutter opening movement has no operative effect so long as the switch member L remains in engagement with the stationary contact L². Similarly, the closure of the switch K during the shutter closing movement has no operative effect so long as the switch member L remains in engagement with the stationary contact L'.

As those skilled in the art will recognize, the shutter actuating mechanism disclosed herein has important practical advantages. For one thing, it does not produce the hum and vibration or chattering which is characteristic of the operation of electromagnetic relays energized by alternating current. Furthermore, while current pulsations in the relay winding H² are largely smoothed out by the condenser H³, the current flow through the valve J and switches K and KA is pulsating, with the result that the tendency to spark at the contacts of the switches K and KA is kept small and relatively insignificant in comparison with that which would be experienced if the winding H² were energized by alternating current. With direct current excitation of the magnet H² and with the magnet energizing voltage desirably provided, sparking would be excessive unless rather elaborate anti-sparking means were provided. As previously noted, the fact that the winding H² is deenergized only for brief intervals at the beginning and end of each exposure, not only reduces the amount of current used, but is especially important because it reduces the heating of the shutter actuating means which must ordinarily be located where such heating tends to injuriously effect adjacent photographic material. The shutter operating mechanism may well be located with the printer housing.

It is possible to manually move the switch member L between its position of engagements with the contacts L² and L' to respectively initiate and terminate exposure periods. In practice, however, the switch L will normally be given its movements by automatic exposure timing apparatus; and Fig. 1 diagrammatically illustrates the control of the switch L by an automatic exposure timing method and an apparatus devised by me, and disclosed and claimed in my prior application Ser. No. 594,403, filed May 18, 1945. That apparatus comprises a measuring lens M through which an image of the picture on the transparency B is projected through a collecting lens MA to a light sensitive device O. As shown, the device O is a photoelectric tube or cell of the high vacuum type. The tube O and lens MA are mounted in a supporting structure $a$ which may be carried by and form a part of the main projection printer housing structure. As diagrammatically shown, the structure $a$ is directly mounted on the tubular casing or housing of the measuring lens M.

As diagrammatically shown in Fig. 1, a measure of the intensity of the light transmitted to the photoelectric cell O, and a control effect dependent upon that intensity, are obtained by means including circuit connections through which the anode 11 and the cathode 12 of the cell O are connected to an amplifying and control system. That system, as shown, includes current supply conductors DC¹ and DC², respectively positive and negative. As shown, said system also includes an electronic triode tube Q and a condenser R in the grid circuit of said tube. In its normal intended use the condenser R is given a regulable electrical charge preparatory to each exposure, and said charge is removed during the following exposure period at a rate dependent upon the current flow through the phototube O, and hence upon the intensity of the light received by the latter. The automatic control of the exposure period effected through the phototube response to the light transmitting capacity of the transparency B may be supplemented by manual adjustment of the condenser charging means to thereby vary the charge given the condenser R, as is hereinafter explained.

As shown, a conductor 13 connects the cathode 12 of the cell O to one terminal of the condenser R and that condenser terminal is connected to the grid 14 of the triode Q. The second terminal of the condenser R is connected to the cathode 15 of the tube Q through a resistance 17. The cathode 11 of the photocell O is connected by a conductor 13A to the plate 16 of the triode Q through resistances 18 and 19 and is connected to ground through a high resistance 20. The second terminal of the condenser R and the lower end of the resistance 17 are also connected to ground through a resistance 21 much smaller than the resistance 20. The plate circuit of the triode Q includes direct current supply conductors $DC^1$ and $DC^2$, the resistance 18 and other resistance hereinafter described.

The previously mentioned resistances 19, 20 and 21 are connected in series with one another and with resistances 22 and 23, to form a so-called bleeder line, or voltage divider, in which the potential progressively diminishes from the upper end of the resistance 19 to the lower end of the resistance 23. The upper end of the resistance 19 is directly connected to the direct current supply conductor $DC^1$, and its potential is constant in normal operation. The lower terminal of the condenser R and the resistance 17 are connected to the voltage divider at a point 24 between resistances 21 and 22. The lower end of the resistance 23 is connected to the direct current supply conductor $DC^2$ by rheostatic means provided in accordance with the present invention and adjustable to vary the potential of the lower end of the voltage divider in a series of steps of definite and predetermined magnitudes.

In the preferred form shown, said rheostatic means comprises adjustable resistances 25, 26, 27 and 28 connected in series between the resistance 23 and the supply conductor $DC^2$, and manually adjustable means through which one, or any larger number, of said resistances may be short-circuited, as is hereinafter fully explained. The potential of the supply conductor $DC^2$ is fixed by connecting it to ground through a glow tube S, so that the potential of the conductor $DC^2$ is negative relative to ground by the potential difference required to maintain current flow through the glow tube.

The triode Q produces its control effect through an electronic relay tube T of the thyratron type. Cathode 15 of the triode Q is connected by a conductor 29 to the control grid 30 of tube T. The latter has its cathode 31 grounded, and has its anode 32 connected to supply conductor $DC^1$ through relay coils 33 and 34, conductor 35, switch 37, conductor 36 and a resistance 38 connecting conductor 36 to supply conductor $DC^1$. The tube T has a screen grid 39 connected through a resistance to the junction point of the resistances 40 and 41 which are connected in series with one another between the glow tube and ground and are proportioned to impress a suitable bias voltage on the screen grid 39.

The coils 33 and 34 are included in the plate circuit of the thyratron T and form the energizing coils connected between the D. C. supply conductors $DC^1$ and $DC^2$, of a relay U which controls the position of switch member L in the shutter relay circuit. With switch 37 closed, the plate circuit of the tube T is completed from conductors $DC^1$ and $DC^2$ by ground connection to the cathode 31 and the glow tube S. The relay U controls separate relay switches UA and L each of those switches being biased to its upper position shown in Fig. 1, and being moved into its lower position by the relay U when the latter is energized by current flow through tube T.

When the tube T is energized and the switch UA is in its lower position it connects the conductor 13 and thereby the upper terminal of the condenser R to the voltage divider at the point at which a slider contact 42 engages the resistance 23. The potential at the point engaged by the contact 42 is lower than at the point 24 to which the lower terminal of the condenser R is directly connected. Said slider contact is connected to one end of a conductor 43 which has its other end connected to the movable switch member of the switch UA. Said movable switch member is connected by a conductor 44 to the conductor 13 and thereby to the upper terminal of the condenser R. When the tube T becomes non-conductive and the relay U is deenergized, the resultant up movement of the movable member of the switch UA breaks the connection between the conductor 13 and the resistance 23.

The slider 42 is adjustable manually longitudinally of the resistance 23, which thus serves as a potentiometer resistance, to vary the charging potential impressed on the condenser R preparatory to each of the exposures. The rheostatic means including the resistances 25, 26, 27 and 28 and associated parts now to be described, form a second and highly reliable means for varying said charging potential in a series of steps of definite and predeterminable magnitude. Said associated parts comprise a plurality of similar relays $W^1$, $W^2$, $W^3$ and $W^4$. As diagrammatically shown, each of said relays includes an energizing coil arranged for energization by alternating supply conductors $L'$ and $L^2$. The lower end of each energizing coil is permanently connected to an alternating supply conductor $L^2$. Through a conductor 45 and a push button 46 the upper end of said coil may be connected to a conductor 47. For purposes hereinafter described, the conductor 47 may be energized and deenergized by means shown diagrammatically as comprising a switch X operative to connect the conductor 47 to, and to disconnect it from an alternating supply conductor L. Each of the relays $W'$—$W^4$ includes two switch members 48 and 49 which are biased to the upper positions in which they are shown, and are moved into their lower positions when the relay is energized by the closure of the corresponding push button switch 46 of the relay, provided the conductor 47 is then connected to and energized by the associated supply conductor $L'$.

When any one of the relays is energized by the depression of the corresponding push button switch 46, the resultant down movement of the switch member 48 of the relay closes a hold-in circuit which maintains said switch member in its lower position after said push button switch 46 is allowed to reopen. The hold-in circuit for the relay $W'$ comprises a conductor 50 connecting the movable switch 48 of the relay to the conductor 47, and includes the lower contact engaged by the switch member 48 when the latter is depressed, said contact being permanently connected to the upper end of energizing coil of the relay $W'$. The hold-in circuit for the relay $W^2$ includes the conductor 50, and a conductor 51 which connects the switch member 48 of the relay $W^2$ to the upper contact associated with the movable switch member 48 of the relay $W'$. The hold-in circuit for the relay $W^3$ includes upper contact associated with the switch member 48 of the relay $W^2$ to the switch member 48 of the relay $W^3$. The hold-in circuit for the relay $W^4$ includes the conductors 50, 51 and 52, and a conductor 53 which connects the upper contact associated with the switch member 48 of the relay $W^3$ to the switch member 48 of the relay $W^4$.

The energization of the relay $W'$ effects a movement of the switch member 49 of that relay which short circuits the resistance 25. The energization of the relay $W^2$ causes its switch member 49 to short circuit both resistances 25 and 26. Similarly, the energization of relay W³ short circuits the resistances 25, 26 and 27 and the energization of the relay W⁴ short circuits all four of the resistances 25, 26, 27 and 28. The means through which one or more of the resistances 25–28 are thus short circuited, comprise a conductor 54 having one end connected to the left-hand end of the resistance 25 and having branches connected to the lower contacts respectively associated with the switch members 49 of the relays W'—W⁴, and also comprise conductors 55, 56 57 and 58 separately associated with the movable switch members 49 of the relays W', W², W³ and W⁴, respectively. As shown, the conductor 55 connects the switch member 49 of the relay W' to the right-hand end of the resistance 25. Similarly, the conductors 56, 57 and 58 connect the switch members 49 of the relays W², W³ and W⁴ to the right-hand ends of the resistances 26, 27 and 28, respectively.

In the normal operative condition of the apparatus, and with shutter E and switch 37 both closed, the thyratron tube E is conductive, the relay U is energized and the condenser R is so charged as to impress sufficient negative bias on the tube Q to make the latter non-conductive. The condenser R acquired its then existing charge through a charging circuit, energized by the voltage across the portion of the voltage divider between the points 24 and 42. The charging circuit may be traced as follows: From the voltage divider point 42 through conductor 43, movable contact member of switch UA, conductor 34 and conductor 13 to the terminal of condenser R which is connected to the control grid 14 of the tube Q, and from the other terminal of condenser to the voltage divider point 24 and through the resistance 22 and the upper portion of the resistance 23 to the point 42.

The energization and deenergization of the relay U causes the switch member L to move into engagement with the stationary switch contacts L² and L' respectively, and thus effects closing and opening movements of the shutter E. With the relay U energized, its deenergization, and thereby the opening of the shutter E, is effected by momentarily opening the switch 37. The subsequent closure of the switch 37 is necessary to, but does not of itself affect the re-energization of the relay U which can occur only after each of the tubes Q and T has become conductive.

With the apparatus in its normal operative condition and with the relay U energized and the condenser Q properly charged, the operation of printing a picture on the sensitized strip F from the transparency C is initiated by opening the previously closed switch 37. This interrupts current flow through the thyratron T and deenergizes the relay U. The deenergization of the relay U operates through the switch UA to open the charging circuit for the condenser Q and operates through the switch L to close the circuit previously described, including the switch member K' and contact K² through which the electromagnet H is energized by the supply conductors AC' and AC² to open the shutter E. The latter then remains open during the period required for current flow through the photoelectric tube O to so reduce the electrical charge previously impressed on the condenser Q that the resultant increase in the potential of the control grid 14 relative to the cathode 15 will make the tube M operatively conductive. When the tube M is thus rendered conductive its plate current flow through the resistance 17 increases the potential of the cathode 15 and thereby the potential of the control grid 30 of the thyratron Q, and thus makes the tube T conductive with the result of energizing the relay U. Thereupon the member L closes the energizing circuit for the solenoid H including the switch member KA' and contact KA², and thus closes the shutter E and terminates the printing operation.

The termination of one printing operation as just described, puts the apparatus in condition for a following printing operation as soon as the sensitized strip F is suitably advanced, and a new transparency B is put in place in the seat C, if the next picture made is not to be printed from the transparency used in making the previous picture, and as soon as any needed adjustment of the condenser charging potential is effected by the actuation of one or another of the push button switches 46. The time required to charge the condenser Q after the charging circuit is established is ordinarily a fraction of a second only, so that usually the condenser will be fully charged by the time the operator is in position to effect actuation of the switch 37 and thereby temporarily disconnect the normally connected conductors 35 and 36 to initiate another printing operation.

For the ordinary uses, now contemplated, of the apparatus shown, the resistances 25, 26, 27 and 28 should have resistance values so chosen and subject to such individual adjustments as to give four different exposure periods, one or another of which will give good reproduction results with practically every one of the different transparency images to be reproduced. If, for example, the transparencies from which prints are to be made are of such character that the average of the exposure periods required for them is five seconds, the resistances 25—28 may well be of such values that when the relay switch W² is energized to short circuit resistances 25 and 26 while leaving resistances 27 and 28 in circuit, a basic exposure period of five seconds will be established. In such case the resistance values may well be such that the exposure period will be seven and a half seconds when only the resistance 25 is short circuited, and will be ten seconds when all of the resistances are short circuited, and will be two and a half seconds when only the resistance 28 is in circuit, and will be one and a quarter seconds when all of the resistances 25, 26, 27 and 28 are short circuited.

While the particular exposure times just stated are suitable for some practical operating conditions, it will be understood that those times are stated by way of illustration and example and not by way of limitation. It will be understood, also, that the exposure period may be varied in the general manner described through more than four steps in some cases, and by a smaller number of steps in other cases. In general, it is practically important, however, that the variations in the exposure period effected by the energization of the different relays W', W², etc. should be of definite magnitudes and suitable for the ordinary range of exposure period variation needed to obtain good results with all, or at least most of the negatives to be reproduced.

The energization of any one of the relays W'—W⁴ will leave a relay hold-in circuit closed so long as the potential between the energizing conductors AC² and 47 is maintained. This makes it desirable to provide some means for insuring that all of the different relay hold-in circuits are open at the end of each printing operation, or at the end of each series of printing operations from the same transparency. As diagrammatically shown, the switch X forms a means for disconnecting the conductor 47 from the supply conductor AC10 and thereby deenergizing the conductor 47. In the apparatus shown, the circuit, including the switch 37, must be opened momentarily at least to initiate the printing of each picture printed.

While the switches X and 37 may well be simple hand-operated switches in some cases, in other cases they may be replaced by automatic switch mechanisms. Such replacement will ordinarily be necessary, or at least desirable, for example, when the present invention is incorporated in an automatic camera control system adapted to print varying numbers of pictures from transparencies successively inserted in the camera.

In the described operation of the apparatus shown, the duration of the exposure period depends upon two factors, namely, the magnitude of the condenser discharging current flow through the photocell O when the charging circuit is opened, and the magnitude of the electrical charge acquired by the condenser when its charging circuit is closed. With the apparatus shown, the current flow through the photocell O is automatically dependent upon the light transmitted to the photocell from the light chamber A' through the transparency B and lens M to the photocell. The magnitude of the condenser charge acquired while the relay is deenergized, depends upon the difference between the potentials of the points 24 and 42 of the voltage divider. Down movement of the slider engaging the potentiometer resistance 23 at the point 42, increases the potential difference between the points 24 and 42, and thereby increases the magnitude of the condenser charge acquired when the switch member UA is in position to connect the point 42 to the conductor 13. Conversely, up movement of the point 42 decreases the magnitude of the charge which can be given the condenser R. The potential difference between the points 24 and 42 may also be increased or decreased without adjustment of the point 42 by respectively decreasing or increasing the resistance between the lower end of the resistance 23, and the supply conductor DC2. As will be apparent, the adjustment of the slider point 42 will ordinarily be in the nature of a somewhat permanent calibration adjustment of the apparatus while the easy and rapidly effected adjustments obtained by the manipulation of the push button switches 46 are temporary working adjustments of the apparatus. One of the last mentioned adjustments is advantageously made every time one transparency B is replaced by another having different reproducing characteristics which should be taken into account in determining the exposure period giving optimum reproduction results.

The need for such compensation adjustments becomes apparent when account is taken of the fact that two transparencies which have the same aggregate light transmitting capacities, may differ widely in the contrasts between their respective light and dark portions. In consequence, an exposure period which will give optimum results in reproducing one transparency picture, will undesirably under expose or over expose similar portions of the picture printed from the other transparency. In general, the compensating adjustments of rheostatic means including the push button switches 46 required for any particular transparency can be determined quickly and with sufficient accuracy by an ordinarily skilled operator from a visual examination of the transparency.

In controlling the exposure period of a reproducing camera by transmitting light through a transparency to a phototube and using the resultant phototube current to control the discharge of a condenser, in the general manner hereinbefore described, it is advantageous to so transmit the light to the phototube as to produce a blurred or more or less completely disintegrated image of the negative picture or a portion thereof, on the cathode of the phototube. The advantage obtained by blurring or disintegrating the image formed on the cathode ordinarily increases as the contrast between light and dark portions of the negative picture increases. The image blurring or disintegrating effect can be readily obtained in an especially simple and effective manner by selecting or arranging the measuring lens G so that the image of the negative picture formed on the cathode surface is out of focus.

In my prior application Ser. No. 594,403, filed May 18, 1945, I have disclosed an automatic shutter control system which includes a relay and operating means therefor like the relay U and its operating means disclosed herein, but which includes means differing from that disclosed herein through which the energization and deenergization of said relay opens and closes the shutter. Novel apparatus features disclosed but not claimed herein are claimed in said prior application.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. The combination with a photographic shutter, of means for giving said shutter to and fro movements between its closed and open positions including an electro-magnet having a winding and an armature which is adapted when said winding is energized to initiate a movement of said shutter from the position which it then occupies into the other of its two positions, and means for energizing said winding comprising alternating current supply conductors, an electronic valve having an anode and a cathode, a control switch having a shutter opening position and a shutter closing position, a shutter opening switch, a shutter closing switch, operating means for the last mentioned switches controlled by movement of the shutter for closing and opening said shutter closing switch as the shutter respectively moves into and away from its closed position, and for closing and opening said shutter closing switch as said shutter moves respectively into and away from its open position, and conductors arranged to connect said winding, anode, cathode, shutter opening switch, and control switch in series between said supply conductors when said shutter is in its closed position and said control switch is in its shutter opening position, and for connecting said winding, cathode, anode and shutter closing switch in series with said control switch between said supply conductors when said control switch is in its shutter closing position.

2. A combination as specified in claim 1, in which said electronic valve is a thyratron having an input circuit including a high resistance.

3. A combination as specified in claim 1 in which said electronic valve is a thyratron having its cathode connected substantially directly to one of said supply conductors and connected through an isolation conductor to the other supply conductor.

4. A combination as specified in claim 1 in which said control switch is actuated to close said shutter by automatic exposure timing mechanism.

5. The combination with a photographic shutter, of mechanism for moving said shutter back and forth between open and closed position comprising the winding and armature of an electromagnet and a mechanical connection between said armature and shutter through which movement of said armature from a first position into a second position and thence back into its first position moves the shutter from either of its open and closed positions into the other of said positions, switch controlled electric circuit means for energizing said winding to move said armature from its first position into its second position, and bias means for moving said armature from its second position into its first position.

6. A combination, as specified in claim 5, in which the mechanical connection between said armature and shutter comprises a member connected to said shutter and pivoted to turn about an axis as said shutter moves between its open and closed positions, and a link pivotally connected at one end to said member at a distance from said axis and pivotally connected at its other end to said armature, said member, armature and link being so relatively arranged that the pivotal connection between said member and link passes through the plane including said axis and the axis of the pivotal connection between the link and armature as the shutter moves between its open and closed positions.

JACOB RABINOWITZ.